United States Patent
Waher

(10) Patent No.: US 9,354,901 B2
(45) Date of Patent: *May 31, 2016

(54) METHOD AND COMPUTER SYSTEM FOR INTRODUCING CLIENT DEVICES INTO A CLIENT-SERVER NETWORK

(75) Inventor: Peter Waher, Solna (SE)

(73) Assignee: Clayster Asia Ltd., Hong Kong (HK)

( * ) Notice: Subject to any disclaimer, the term of this patent is extended or adjusted under 35 U.S.C. 154(b) by 63 days.

This patent is subject to a terminal disclaimer.

(21) Appl. No.: 13/379,666

(22) PCT Filed: Jun. 21, 2010

(86) PCT No.: PCT/EP2010/058704
§ 371 (c)(1),
(2), (4) Date: Feb. 23, 2012

(87) PCT Pub. No.: WO2010/149606
PCT Pub. Date: Dec. 29, 2010

(65) Prior Publication Data
US 2012/0197982 A1    Aug. 2, 2012

(30) Foreign Application Priority Data
Jun. 22, 2009   (EP) .................................... 09163354

(51) Int. Cl.
G06F 15/16    (2006.01)
G06F 9/445    (2006.01)

(52) U.S. Cl.
CPC ...................................... *G06F 9/445* (2013.01)

(58) Field of Classification Search
CPC ...................................................... G06F 9/445
USPC ........................................................ 709/203
See application file for complete search history.

(56) References Cited

U.S. PATENT DOCUMENTS

| 6,871,345 | B1 * | 3/2005 | Crow | G06F 8/67 709/203 |
| 7,469,284 | B1 * | 12/2008 | Dubrovsky | H04L 41/042 709/201 |
| 7,861,223 | B1 * | 12/2010 | Schmidt | G05B 19/41845 717/106 |
| 8,054,319 | B2 * | 11/2011 | Lee | H04N 5/45 345/620 |

(Continued)

FOREIGN PATENT DOCUMENTS

WO    2009/017816    2/2009

OTHER PUBLICATIONS

Martin Muhlenbrock, PCT Written Opinion, parent application PCT/EP2010/058704, Issued Mar. 9, 2011, European Patent Office, Rijswijk, NL.

(Continued)

*Primary Examiner* — Waseem Ashraf
(74) *Attorney, Agent, or Firm* — Babcock IP, PLLC

(57) ABSTRACT

The invention relates to a method for converting generic application instructions stored on a server to a client specific application for a client device, wherein the server and the client device are arranged in a client-server network. The method comprises selecting a suitable plug-in based on a rating system and using the selected rendering plug-in to convert generic application instructions to a client specific application. By means of the invention it is provided a flexible solution for introducing new client devices to the client-server network, since any discrepancies between different types of client devices may be resolved by the rendering plug-in.

10 Claims, 3 Drawing Sheets

(56) References Cited

U.S. PATENT DOCUMENTS

| | | | | |
|---|---|---|---|---|
| 2002/0065828 A1* | 5/2002 | Goodspeed | G06F 17/30887 | |
| 2002/0099829 A1* | 7/2002 | Richards | G06F 17/30899 | 709/227 |
| 2002/0161863 A1* | 10/2002 | McGuire | H04L 41/0806 | 709/220 |
| 2003/0023671 A1* | 1/2003 | Abdulrahiman | H04L 29/06 | 709/203 |
| 2005/0222971 A1* | 10/2005 | Cary | G06Q 10/109 | |
| 2005/0267935 A1* | 12/2005 | Gandhi | H04L 29/1232 | 709/203 |
| 2006/0173951 A1* | 8/2006 | Arteaga | H04L 67/1095 | 709/203 |
| 2007/0214454 A1* | 9/2007 | Edwards | G06F 17/3089 | 717/176 |
| 2007/0234321 A1* | 10/2007 | Mcdowali | G06F 9/44526 | 717/141 |
| 2007/0264985 A1* | 11/2007 | Kapur | G06F 8/38 | 455/414.1 |
| 2007/0294343 A1* | 12/2007 | Daswani | G06F 17/30899 | 709/203 |
| 2008/0189604 A1* | 8/2008 | Washburn | G06F 17/3089 | 715/255 |
| 2008/0195997 A1* | 8/2008 | Herberger | G06F 8/34 | 717/100 |
| 2008/0215987 A1* | 9/2008 | Alexander | G05B 15/02 | 715/737 |
| 2008/0282227 A1* | 11/2008 | Neil | G06F 9/4443 | 717/115 |
| 2009/0037515 A1* | 2/2009 | Zapata | H04L 43/0811 | 709/202 |
| 2009/0037724 A1* | 2/2009 | Carion | G06F 9/4445 | 713/100 |
| 2009/0172576 A1* | 7/2009 | Cheaz | G06F 9/4443 | 715/765 |
| 2009/0254605 A1* | 10/2009 | Clavel | G06F 9/5044 | 709/203 |
| 2009/0259953 A1* | 10/2009 | Jannott | G06Q 10/06 | 715/762 |
| 2009/0322714 A1* | 12/2009 | Lee | H04N 5/45 | 345/204 |
| 2010/0161713 A1* | 6/2010 | Gangadharappa | G06Q 10/10 | 709/203 |
| 2010/0161720 A1* | 6/2010 | Colligan | G06Q 30/02 | 709/203 |
| 2010/0169003 A1* | 7/2010 | Van Der Meer | G06F 17/3087 | 701/408 |
| 2010/0306689 A1* | 12/2010 | Jarvenpaa | G06F 9/44526 | 715/772 |
| 2011/0234627 A1* | 9/2011 | Faulkner | G06F 3/14 | 345/619 |
| 2014/0149966 A1* | 5/2014 | Binjrajka | G06F 8/72 | 717/121 |

OTHER PUBLICATIONS

Butler et al: "implementing Content Negotiation using CC/PP and WAP UAProf", Aug. 7, 2001, XP007914364 (HP Laboratories Bristol, HPL-2001-190).

Butler M H: "Current Technologies for Device Independence", Apr. 4, 2001, pp. 1-28, XP002373941 (HP Laboratories Bristol, HPL-2001-83).

* cited by examiner

METHOD AND COMPUTER SYSTEM FOR INTRODUCING CLIENT DEVICES INTO A CLIENT-SERVER NETWORK

TECHNICAL FIELD

The present invention relates to a client-server network. In particular, the present invention relates to a flexible solution for introducing client devices into a client-server network.

BACKGROUND OF THE INVENTION

Client-server networks where a set of client devices are connected to a server over a computer network are increasingly utilized to allow users to access remote data. The client-server networks may utilize "fat clients" or "thin clients".

For networks using fat clients, the client device functions as a small computer, and the primarily processing activities occurs at the client. This means that an application typically is uploaded from the server to the client, wherein the client handles the application functionality. However, the resources required in a fat client, e.g. in terms of processors and memory, adds to the cost of the client.

Thin clients typically offer a more cost efficient solution as the thin clients typically are focused on providing capabilities for inputting and outputting information to a user, whereas they primarily depends on the server for processing activities. Thus, the thin clients typically interact with an application on the server, wherein the server handles the application functionality.

US 2002/0109718 relates to a distributed UI (user interface) for a server-based application. The client communicates with a UI server over a network. The UI server performs formatting for the UI, which preferably utilizes a number of native UI controls that are available locally at the client. In this manner, the client needs only be responsible for the actual rendering of the UI. As a consequence, the client need not be specifically configured to support each application.

However, whereas additional functionality can be added to the UI server without having to install additional software on the client, the client must still be compatible with the UI formatting used by the server application. This means that when a new client, which has not been specifically designed for the UI formatting used by the server application, is introduced to the client-server network, the client's firmware must be updated to support the available UI formatting, making the addition of more client devices complex and time consuming. Thus, there is a need for a more flexible solution.

SUMMARY OF THE INVENTION

In view of the above, an object of the invention is to at least alleviate the problems discussed above. In particular, an object is to provide a flexible solution for introducing a client device into a client-server network.

According to an aspect of the invention, there is provided a method for converting generic application instructions available at a server to a client specific application for a client device, wherein the server and the client device are arranged in a client-server network. The method comprises the steps of receiving an application request from the client device, the request comprising a client specification, providing a list of available rendering plug-ins, determining a compatibility rating for at least one of the rendering plug-ins on the list, wherein the compatibility rating is based on the compatibility between the rendering plug-in and the client specification, selecting one rendering plug-in fulfilling a predetermined criterion, using the selected rendering plug-in to convert the generic application instructions to the client specific application, and providing the client specific application to the client device.

The present invention is based on the understanding that by providing generic application instructions and using a rendering plug-in for converting the generic application instructions into a client specific application executable by the client device, a flexible solution for introducing new client devices to an application platform modeled as a client-server network can be achieved, since any client specific information that may arise due to e.g. the communication protocol, web browsers, and/or hardware resources used by the client device can be handled by the rendering plug-in. An advantage herewith is that the generic application instructions and any client devices can be independently designed. It also promotes longevity of applications, since the applications are not bound to a specific client hardware, software or communication strategy, and thus, new client hardware and software can be introduced without the need to upgrade applications.

Furthermore, by providing a client specification with information about the client device that is relevant when determining an appropriate rendering plug-in, and rating the available rendering plug-ins based on their compatibility with the client specification, a suitable rendering plug-in can be automatically selected based on a predetermined criterion. By running the rendering plug-in on the server it is possible to further reduce the processing activities at the client device, thereby allowing a small, simple, and inexpensive client device to be used.

The above described method may preferably be used to allocate a suitable rendering plug-in when the client device is connected to the network. The allocated rendering plug-in may then be used for this client device, as long as it remains connected to the client-server network. However, if required, the method may also be used subsequently, e.g. to select another rendering plug-in if the performance of the currently used rendering plug-in is not satisfactory.

According to an embodiment, the predetermined criterion may be a predetermined compatibility level, wherein the step of selecting a rendering plug-in may comprise the steps of iteratively rating the rendering plug-ins on the list of available rendering plug-ins; and, when encountering one rendering plug-in with a rating meeting the predetermined compatibility level, selecting that rendering plug-in. This provides an efficient way of determining an appropriate rendering plug-in.

According to a preferred embodiment, the criterion may however be to select the rendering plug-in having the highest compatibility rating from a set of rendering plug-ins on the list of available rendering plug-ins, wherein the step of selecting a rendering plug-in may comprise rating all of the rendering plug-ins in the set; and selecting the rendering plug-in having the highest compatibility rating. The set of rendering plug-ins may be a subset of the rendering plug-ins on the list of available rendering plug-ins. However, the set of rendering plug-ins may more preferably comprise all rendering plug-ins on the list of available rendering plug-ins to ensure that the most appropriate rendering plug-in is selected.

The list of available rendering plug-ins may comprise at least one standard rendering plug-in, wherein the step of determining the compatibility rating is such that one standard rendering device is selected, unless there is at least one client specific rendering plug-in on the list of available rendering plug-ins. A standard rendering plug-in here refers to a rendering plug-in that, unlike a client specific rendering plug-in, has not been specifically configured to handle a specific type of client device. There may preferably be at least one standard rendering plug-in per protocol supported. For example, there may be one standard rendering plug-in for HTML (Hypertext Mark-up Language) over HTTP (Hypertext Transfer Protocol), one for SVG (Scalable Vector Graphics) over HTTP, one for bitmap over TCP (Transmission Control Protocol), etc. However, the standard rendering plug-ins may also be more specific. For example, there may be one for each browser type in the case of HTML over HTTP (e.g. Internet Explorer, Firefox, Opera, Safari, etc).

An advantage with providing a standard rendering plug-in is that as a new client device is connected to the client-server network, and there is no client specific rendering plug-in available for that client device, the standard rendering plug-in may typically be able to support the fundamental features of the client device. Thus, a user may immediately start using the client device.

The generic application instructions may comprise meta-information describing the layout and functionality of a GUI (Graphical User Interface) without client-specific information. Also, according to an embodiment, the generic application instructions may include a Macro-layout, being a first set of meta-information configured to control a main disposition of the GUI on the client device by dividing it into sub-regions, and a Micro-layout, being a second set of meta-information configured to control a disposition within one of the sub regions of the GUI. The rendering plug-in may then transform the meta-information into a client specific application that may be executed on the client device to render a GUI, i.e. a viewable picture on the client device that may include user interaction logic.

According to an embodiment, the rendering plug-in may create a client specific application by: evaluating the resolution of a display area on the client device; dividing the display area into a set of sub regions according to a Macro-layout; scaling the Macro-layout to fit the display resolution; allocating a Micro-layout to each sub region; scaling the Micro-layout to fit the sub region; and rendering a GUI based on the Macro-layout and the Micro-layout by applying a theme containing design guidelines.

According to a further aspect of the invention, there is provided a method for converting an output received from a client specific application executed on a client device to an input interpretable by generic application instructions running on a server, wherein the server and the client device are arranged in a client-server network. The method comprises the steps of using a rendering plug-in to convert the output from the client specific application to an input interpretable by the generic application instructions; and providing the input to the generic application instructions. The rendering plug-in may preferably be selected as discussed above. This aspect of the invention provides similar advantages as discussed above in relation to the previous aspect of the invention.

According to a still further aspect of the invention, there is provided a computer system comprising: a server; a client device connected to the server over a computer network; an application platform installed on the server, wherein the application platform is configured to model a client-server network; a set of service applications plugged in to the application platform, wherein each service application is configured to provide generic application instructions to the application platform; and a set of rendering plug-ins installed on the application platform, wherein the rendering plug-ins are configured to convert the generic application instructions into a client specific application executable by the client device. According to an embodiment, one of the set of rendering plug-ins is selected as described above.

Other objectives, features and advantages will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS

Figure 1:
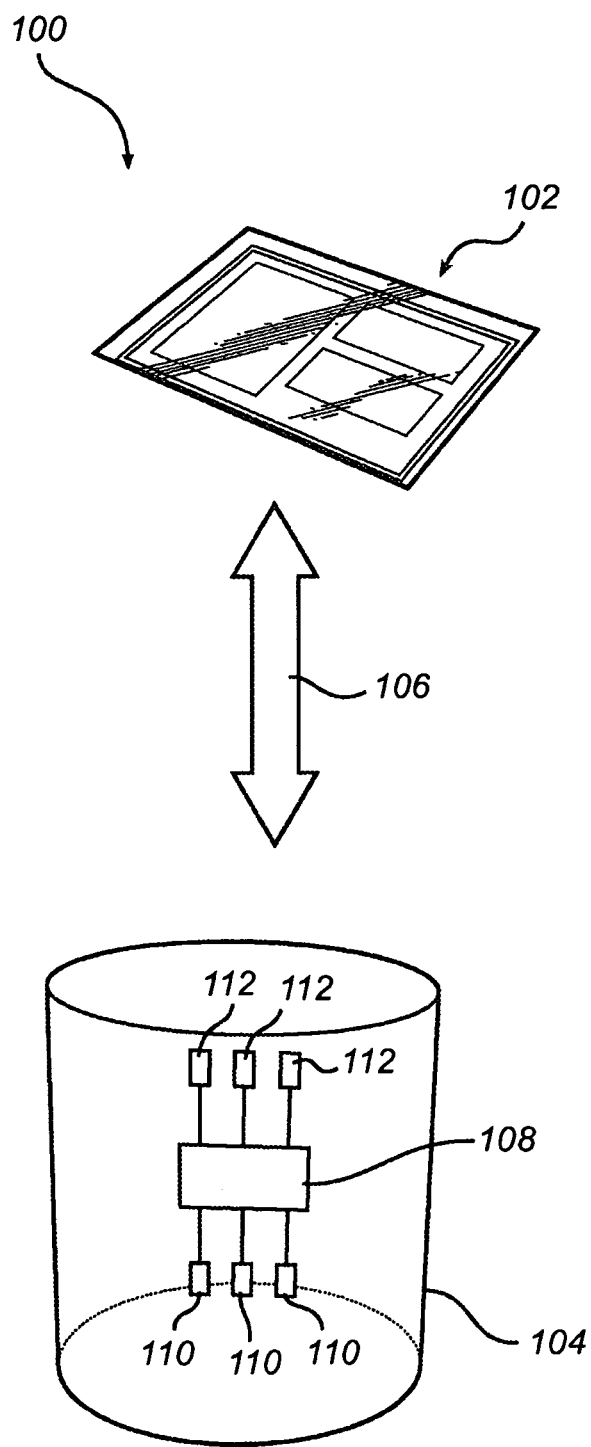
FIG. 1 is a block diagram schematically illustrating a client-server network according to an embodiment of the present invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to those skilled in the art. Like reference characters refer to like elements throughout.

Referring now to the drawings and FIG. 1 in particular, there is depicted the main components in an embodiment of the invention. In FIG. 1 is depicted a client-server network 100 where a client device 102 is connected to a server 104 over a computer network 106. Although there is only a single client device 102 depicted in FIG. 1, the client-server network may typically comprise a plurality of clients connected to the server. The computer network 106 may be a wired computer network such as a WAN (Wide Area Network) or a LAN (Local Area Network) to enable fast and reliable communication between the client device 102 and the server 104. However, a wireless communication link may also be utilized.

The client device 102 is here a thin client device provided with a touch screen. However, other devices may also serve as a client device such as, for example, a digital TV, a computer screen or a mobile phone. Furthermore, other input means such as e.g. a keyboard, mouse, joystick, or a remote control may be utilized in addition to or instead of the touch screen.

An application platform, here being an XML (Extensible Mark-up Language) based service delivery platform 108, is installed on the server 104 to model the client-server network 100. Although the illustrated client-server network 100 has a single server 104, the service delivery platform 108 may provide remote hosting with any number of distributed servers that may be child servers, parent servers, or clustered servers.

A plurality of service applications 110 are plugged into the service delivery platform 108, wherein each service application is a computer program configured to provide meta-information to the service delivery platform 108. Accordingly, the service application provides an abstract description of a service (including application logic, i.e. logic to handle specific events) that is to be performed by the client device without any details that requires knowledge about client-specific information such as the client hardware, protocols used, etc. Examples of possible services are news highlights; traffic camera; e-mail; weather forecast; calendar; house entry phone service; and laundry booking service. The service applications 110 may, for example, be implemented as .NET based dynamic-link libraries (DLLs) 112.

Figure 2:
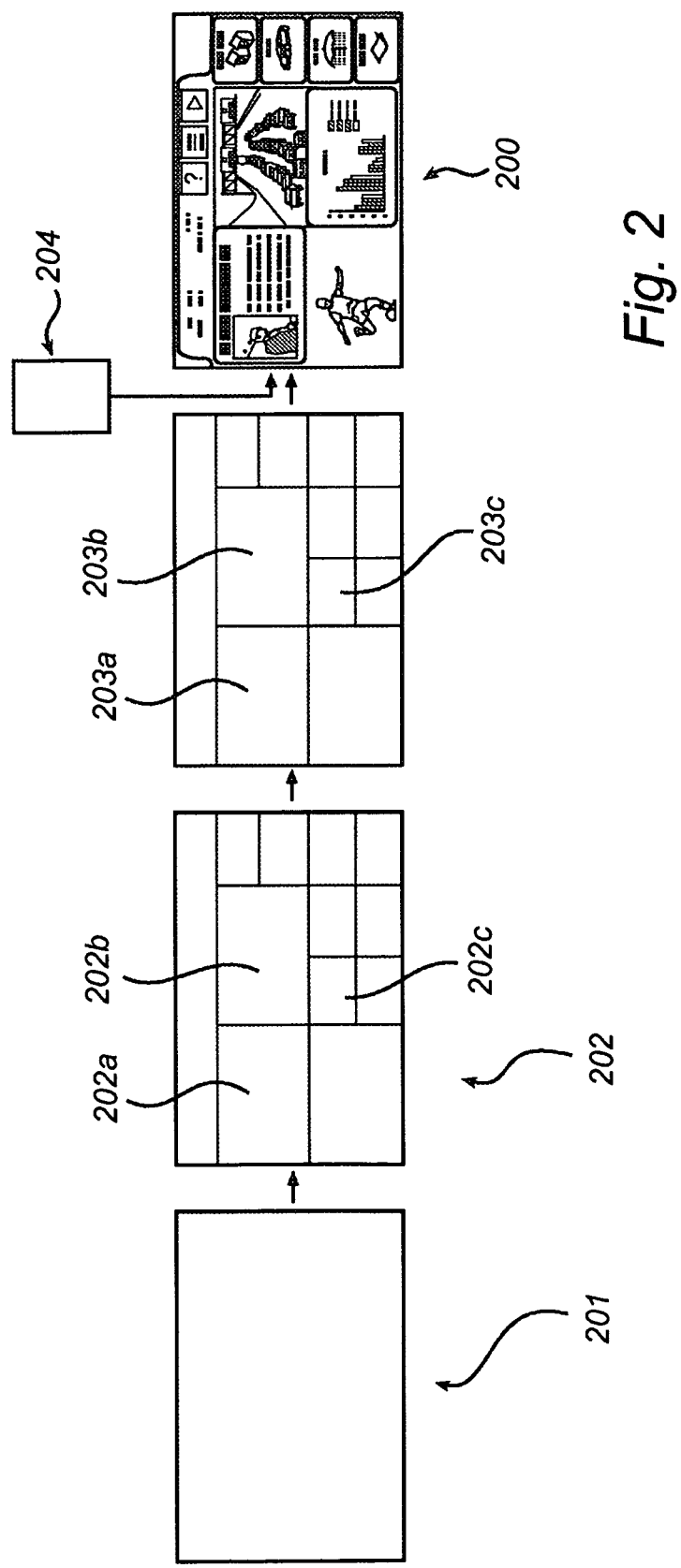
FIG. 2 schematically illustrates how a GUI is based on the client display resolution, a Macro-layout, a set of Micro-layouts, and a theme.

FIG. 2 schematically illustrates how a GUI 200 can be generated on the client device from four types of input data using a renderer. The four types of input data are: a client display resolution 201; a Macro-layout 202; a set of Micro-layouts 203; and a theme 204.

The interface 200 is here a so-called "ten foot interface". The ten foot interface typically has a less detailed and less complex layout than a "two foot interface" used by a conventional computer monitor. Thus, the ten foot interface can preferably be used for screens having a lower resolution than a conventional computer monitor, such as e.g. a TV-screen or a user interface for a control system. Although the name suggests that the ten foot interface is designed and proportioned to be viewed at a distance of about ten feet, rather than a viewing distance of about two foot as is the case for a conventional computer monitor, the ten foot interface may be convenient also for shorter viewing distances. For example, a ten foot interface can preferably be used for a GUI displayed on a small screen, such as on a mobile phone, or on a touch screen.

The client display resolution 201 can be provided by an initialization function containing a script that evaluates the available resolution of the display of the client device. As an alternative, the resolution 201 can be provided by an URL (Uniform Resource Locator), for example, when a HTTP based protocol is used.

The Macro-layout 202 is meta-information that determines the division of the available client display resolution into sub regions 202a-c. (To avoid cluttering the figure only three of the sub regions have been provided with a reference numeral.) The Macro-layout contains no absolute positions, thus making it scalable. Further, for each sub region, the Macro-layout 202 determines which service should be displayed therein by pointing to one of the service applications 110, and determining whether the service application will be displayed as a brieflet, button, dialog, header, dynamic menus, etc. The Macro-layout is typically provided by the service delivery platform 108, and may, for example, be set by a user in a setup menu on the client device.

The Micro-layouts 203a-c are meta-information that provide the content and layout of the service assigned to each sub region 202a-c. To avoid cluttering the figure only three of Micro-layouts have been provided with a reference numeral. For example, the illustrated Micro-layouts 203a-c may provide news highlights, traffic camera, and e-mail. The Micro-layout contains no absolute positions, thus making it scalable. Micro-layouts are part of the code of the service applications 110. Furthermore, by calling additional service applications from the Micro-layout of a "parent" service application, a service package can be created that displays the information or functions from several service applications.

The theme 204 is a set of graphic attributes to provide a desired "look and feel" of the GUI. The theme typically determines the visual appearance in terms of colors, background images, font styles, font sizes, spacing, paragraph style formatting, etc. Themes enable the GUI to be displayed in a variety of styles, and can be used for company branding or to give end-users a menu of styles to suit personal preferences. The themes can be created in e.g. Visual Studio, Adobe Illustrator, and Photoshop, and can be implemented by a theme definition file and a style guide file which files typically are different for different renderers. Style guide files used for HTML/HTTP are written in CSSX, i.e. CSS (Cascading Style Sheets) files with embedded script to make them dynamic, whereas style guide files used for BMP (Bitmap) and/or TCP are specified using XML. The theme definition file establishes the theme as an object in the service delivery platform, whereas the style guide file provides the style parameters. The style guide file typically differs for different renderer base types, such as HTML/HTTP, SVG/HTTP, BMP/TCP. For example, there are different style guide files for BMP clients, DHTML (Dynamic Hypertext Markup Language) clients (e.g. laptop screens, browsers), and SVG clients (e.g. mobile phones).

The client-server network 100 also includes a set of rendering plug-ins 112 to help transform the Macro-layout 202 and the Micro-layouts 203 into a GUI 200. Each rendering plug-in is a computer program, plugged in to the service delivery platform 108, and being configured to create a client specific application by transforming a Macro-layout 202 and its associated Micro-layouts 203 into a client specific application 114 by limiting the Macro-layout to the client display resolution, limiting the Micro-layouts to the sub regions, and applying an appropriate theme. The resulting client specific application 114 can then be executed by a specific client device 102 to render a GUI 200.

It can be noted that the rendering plug-ins 112 only handles the hardware resources and capabilities of the client device, and thus require no knowledge about the functionality of the services. This makes it easy to develop service applications for a variety of clients of different types, and virtually eliminates the need to modify the service applications when new types of clients are introduced.

It is recognized that the client specific application will vary based on the type of rendering plug-in used. For example, a DHTML rendering plug-in renders content as DHTML for web browser access, whereas a bitmap rendering plug-in renders the entire screen at the server and sends it to the client device as a bitmap. As the bitmap-based GUI is used, only the active portions of the screen are sent and the client device updates the corresponding regions accordingly. Multiple layers are maintained to handle client animation during user interaction. Another example of a rendering plug-in is an SVG rendering plug-in, which may preferably be used for embedded devices such as set top boxes and mobile phones where smaller graphics files are a distinct advantage.

The rendering plug-ins may be categorized into standard rendering plug-ins and client specific rendering plug-ins. Unlike the client specific rendering plug-ins, the standard rendering plug-ins has not been configured to handle a specific client. The client specific rendering plug-ins may be based on the standard rendering plug-ins. Thus, it is only required to implement support for what is really unique for that client device, such as, e.g. connection to media player, or specific hardware resources, etc.

Figure 3:
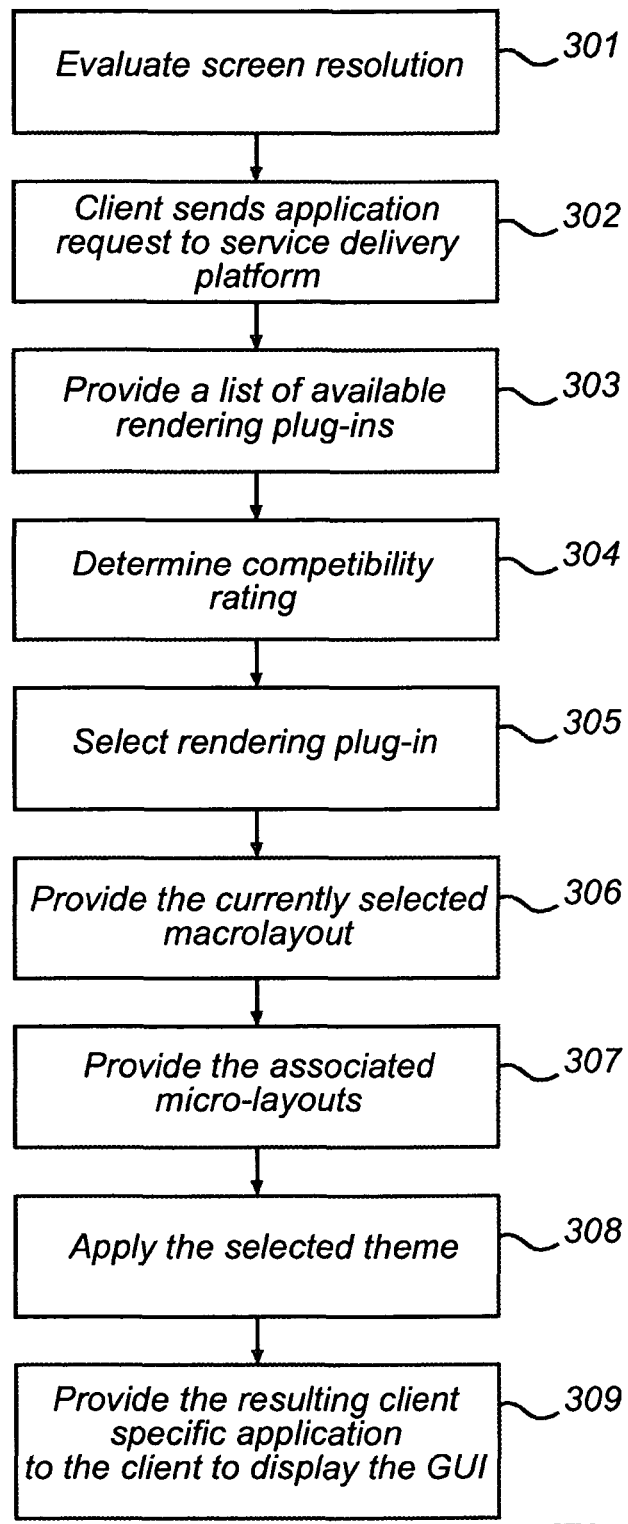
FIG. 3 is a flow chart schematically illustrating the fundamental steps of a method according to an embodiment of the present invention for converting generic application instructions stored on a server to a client specific application.

The operation of the client-server network 100 will now be described with reference to the schematic block diagram in FIG. 3. As the client device 102 is connected to the client-server network 100, the client screen resolution is evaluated by the initialization function in step 301, or, if the client connects using HTTP, the resolution is provided in an URL.

Further, in step 302, the client device 102 sends an application request to the service delivery platform 108. The application request includes a client specification which may be an XML-document comprising identification information that may be relevant when selecting an appropriate rendering plug-in 112. Alternatively, if HTTP is used as a communication protocol, the identification information may be included in a HTTP Request Header as a so-called User Agent, i.e. a string that comprises e.g. browser family, hardware platform, and version. This is typically sufficient information to determine how well the client device 102 is supported by a rendering plug-in 110. However, it is recognized by a person skilled in the art that the content of the identification information may vary. For example, a client device ID may be used to identify the client device instead of the user agent. Also, information about hardware resources of the client device may be included in the client specification (such as resolution, video/audio codecs, tuners, LEDs (light emitting diodes), meters and controllable device, etc) to help determine how well the client device is supported by a rendering plug-in.

Furthermore, in the BMP/TCP case, information that is sent in HTTP Request headers in the HTTP case, are sent in a specific handshake message, that is part of the home arena bitmap protocol (proprietary protocol).

In step 303, a list of available rendering plug-ins is provided by the service delivery platform 108. This typically includes all of the rendering plug-ins that are plugged in to the service delivery platform.

In step 304, a compatibility rating is determined by each available rendering plug-in 112. This rating may be based on implicit information and/or on explicit information. For example, if HTTP is used as a communication protocol, all the rendering plug-ins 112 that do not support HTTP may be excluded. Each of the remaining rendering plug-ins 112 may then determine a compatibility rating on how well it supports the specific client device in question based on the information in the User Agent.

It may be convenient to use a compatibility rating divided into, for example, five degrees, such as: "Not at all", "Barely", "OK", "Well", and "Perfect". Here "Not at all" means that the client device is definitely not supported by the rendering plug-in in question, "Barely" means that it is undecided but there is a chance that the client device is supported by the rendering plug-in, "OK" means that the most fundamental features are supported, "Well" means that the rendering plug-in is adapted to handle the specific brand of the client device in question, whereas "Perfect" means that the rendering plug-in is adapted to handle the specific brand and model of the client device in question. The resulting compatibility rating is then reported by each rendering plug-in 112 to the service delivery platform 108.

For example, as a Motorola VIP-1910 Set-top-box running an HTML browser (based on the Firefox browser) connects to the server, the following renderers would return the following support grades:

BMP/TCP Renderer: Not at all
Base HTML Renderer: Barely
Firefox HTML Renderer: OK
Motorola Set-top-box generic renderer: Well
Motorola VIP 19xx Set-top-box renderer: Perfect In step 305, the service delivery platform 108 selects one rendering plug-in based on a predetermined criterion.

The predetermined criterion may be that the compatibility rating should meet at least a predetermined compatibility level. For example, the service delivery platform may choose the first rendering plug-in found that has a compatibility rating being at least "OK". However, more preferably the predetermined criterion may be to select the rendering plug-in having the highest relative compatibility rating among the available rendering plug-ins, or if there is more than one rendering plug-in that has obtained the highest relative rating, selecting one of these, e.g. the one that is first encountered.

Note that the service delivery platform 108 here selects the rendering plug-in 108 with the highest relative compatibility rating, even if the absolute level of the compatibility rating is low. This means that, unless all available rendering plug-ins has the rating "Not at all", the client device will always have some support by the service delivery platform 108, even if there may be many features that will not be supported. If all rendering plug-ins has the rating "Not at all" the client device is denied access.

In step 306, the selected rendering plug-in retrieves a file containing the currently selected Macro-layout, and provides the layout 202 described therein. In doing so, the size of the Macro-layout is limited to the available screen resolution determined in step 301.

In step 307, the rendering plug-in 112 calls the service application 110 associated with each the sub region 202a-c using the pointers in the Macro-layout file. Thus, for each sub region, the rendering plug-in displays the service according to the corresponding Micro-layout 203a-c in the service application. In doing so, the size of each Micro-layout 203a-c is limited to the size of its associated sub region.

Furthermore, as illustrated by step 308, the currently selected theme for colors and style is applied.

Then, in step 309, the resulting client specific application is sent to the client device 102 where it is executed to display a GUI 200 on the touch screen of the client device. In addition to displaying information to a user, the GUI typically includes interaction logic that may handle events etc. Therefore, the rendering plug-in may preferably be configured also to convert an output from the client specific application executed on the client device to an input interpretable by the service applications.

Examples of Micro-layout elements that may render client user interaction logic are:

Command Area: If clicking inside a command area, a click event is sent to the service application that produced the element. A command area can come in different styles: Transparent, Normal (i.e. has a highlighted background when clicked), boxed (area surrounded by a box), etc. It can also have quick keys (1, 2, 3 . . . ) which can be used by the client device, if supported. On set-top-boxes these quick keys can be rendered to logic that detects the use of the red, green, blue and yellow buttons, for example.

Buttons: Content rendered within a graphic button that is visibly pressed when clicked. Otherwise works as a command area, but is easier for client devices to use if only a button is desired.

Click area: An area, that when clicked, the coordinates within the area are sent back to the service application (in relative coordinates, not screen coordinates—which are client specific).

Menu Item: Works as a command area, but a different menu selection event is created.

Text input areas: Text input using keyboards, remote controls, or virtual keyboards are handled using client interaction logic. Two types of events are sent from the client specific application to the generic service application creating this element. The first type of events is asynchronous text update events. These are not sent for every key, but regularly (depending on network performance, etc.) to keep the application aware of what the user is typing. The second type of events is an update event when the user is finished typing or goes to the next page, etc.

ChannelChanged: Channel input (i.e. switching channels on a TV) is handled much in the same way as text input above.

Client specific applications can themselves send asynchronous events to service applications to report different status information. For example, the client can report DVB Tuner search status while searching (and finding) channels.

Possibly, a list of available hardware resources is reported by the client device 114 when the rendering plug-in has been assigned. This list may preferably comprise a specification over all hardware resources available to the client, categorized as well as with information about parameters, commands, etc. These hardware resources can then be published by the service delivery platform 108, via the rendering plug-ins 112, to available service applications 110. The service applications 110 can then interact with the hardware resources via these parameters and commands, and the rendering plug-ins 112 provides that communication.

Also, the service delivery platform may support free communication from client to server, but also from server to client. Although, communication can only be initiated by the client for certain protocols (e.g. HTTP), the rendering plug-in solves this so that service applications on the server can send messages to the clients, although HTTP is used. This can be done using an XmlHttpRequest-object. Two methods can be used: Either repetitive polling, when the client repetitively (using a configurable time interval) asks the server if changes or messages are available (which are stored in queues on the server). The other method is to use delayed responses, i.e. the client asks the server "Whats new?", but the server waits (up to a configurable period of time) for something to happen before responding. If nothing has happened, an empty response is returned, and the client immediately asks again. Using any of these techniques it is possible to push information from the server to the client, using the HTTP protocol, regardless of the fact that HTTP is client driven, i.e. communication can only be instantiated from the client.

The person skilled in the art realizes that the present invention is not limited to the preferred embodiments. For example, the compatibility rating is not limited to the client display, but is also applicable for other hardware resources of the client, e.g. to determine if a specific sound or video file can be played on the client in question. Furthermore, although the service applications have been described as .NET-based dynamic-link libraries (DLLs) the invention is not limited thereto. There may also be specific services that convert logic stored in XML-files to meta-information. This enables an application which is specified in a XML-file to be plugged in to the service delivery platform without a need to code it in .NET. An example thereof would be an XML-service engine which may take an XML-file (with optional embedded script via a script engine), for example including a request form, convert it to a dynamic meta-information, handle the interaction of the user, etc. Other examples may be Podcasts, video definitions, web cameras, etc which can all be specified by simple XML-files, without a need to code them in .NET.

Such and other obvious modifications must be considered to be within the scope of the present invention, as it is defined by the appended claims. It should be noted that the abovementioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims. Also, the disclosed method steps may be executed in any different order.

I claim:

1. Method for converting generic application instructions to a client specific application for a client device, the generic application instructions comprising meta-information describing a layout and a functionality of a graphical user interface (GUI) of an application service, without client-specific information, the generic application instructions being available at a server, wherein said server and said client device are arranged in a client-server network, the method comprising the steps of:
    receiving, at the server, an application request from the client device, said request comprising a client specification defining the hardware resources and capabilities of the client device;
    providing, at the server, a list of available rendering plug-ins;
    determining, at the server, a compatibility rating for at least one of the rendering plug-ins on said list, wherein the compatibility rating is based on the compatibility between the rendering plug-in and the client specification;
    selecting, at the server, one rendering plug-in fulfilling a predetermined criterion;
    creating, at the server, an executable client specific application to be executed by the client device and for allowing a user of the client device to interact with the application services, the client specific application comprising the GUI, the client specific application created using the selected rendering plug-in;
    providing the executable client specific application to said client device; and
    executing the client specific application on said client device to render the GUI for providing the functionality of the service,
    wherein the list of available rendering plug-ins comprises at least one standard rendering plug-in, and
    wherein the determining of the compatibility rating is such that the standard rendering plug-in is selected unless there is at least one client specific rendering plug-in on the list of available rendering plug-ins.

2. Method according to claim 1, wherein the predetermined criterion is a predetermined compatibility level, and said step of selecting a rendering plug-in comprises the steps of:
    iteratively rating the rendering plug-ins on said list of available rendering plug-ins; and
    when encountering one rendering plug-in with a rating meeting the predetermined compatibility level, selecting that rendering plug-in.

3. Method according to claim 1, wherein the predetermined criterion is to select the rendering plug-in having the highest relative compatibility rating from a set of rendering plug-ins on said list, wherein said step of selecting a rendering plug-in comprises:
    rating all of the rendering plug-ins in said set; and
    selecting the rendering plug-in having the highest relative compatibility rating.

4. Method according to claim 1, wherein the generic application instructions comprise a Macro-layout, being a first set of meta-information configured to control a main disposition of a GUI (Graphical User Interface) on the client device by dividing it into sub regions, and a Micro-layout, being a second set of meta-information configured to control a disposition within one of the sub regions of the GUI.

5. Method according to claim 1, further comprising the steps of:
- evaluating the resolution of a display area on the client device;
- dividing the display area into a set of sub regions according to a Macro-layout;
- scaling the Macro-layout to fit the display resolution; allocating the Micro-layout to each sub region; scaling the Micro-layout to fit the sub region; and
- rendering a GUI based on the Macro-layout and the Micro-layout by applying a theme containing design guidelines.

6. Method according to claim 2, wherein the generic application instructions comprise a Macro-layout, being a first set of meta-information configured to control a main disposition of a GUI (Graphical User Interface) on the client device by dividing it into sub regions, and a Micro-layout, being a second set of meta-information configured to control a disposition within one of the sub regions of the GUI.

7. Method according to claim 2, further comprising the steps of:
- evaluating the resolution of a display area on the client device;
- dividing the display area into a set of sub regions according to a Macro-layout;
- scaling the Macro-layout to fit the display resolution;
- allocating the Micro-layout to each sub region; scaling the Micro-layout to fit the sub region; and
- rendering a GUI based on the Macro-layout and the Micro-layout by applying a theme containing design guidelines.

8. Method according to claim 3, wherein the generic application instructions comprise a Macro-layout, being a first set of meta-information configured to control a main disposition of a GUI (Graphical User Interface) on the client device by dividing it into sub regions, and a Micro-layout, being a second set of meta-information configured to control a disposition within one of the sub regions of the GUI.

9. Method according to claim 3, further comprising the steps of:
- evaluating the resolution of a display area on the client device;
- dividing the display area into a set of sub regions according to a Macro-layout;
- scaling the Macro-layout to fit the display resolution;
- allocating the Micro-layout to each sub region; scaling the Micro-layout to fit the sub region; and
- rendering a GUI based on the Macro-layout and the Micro-layout by applying a theme containing design guidelines.

10. Method according to claim 4, further comprising the steps of:
- evaluating the resolution of a display area on the client device;
- dividing the display area into a set of sub regions according to a Macro-layout;
- scaling the Macro-layout to fit the display resolution;
- allocating the Micro-layout to each sub region; scaling the Micro-layout to fit the sub region; and
- rendering a GUI based on the Macro-layout and the Micro-layout by applying a theme containing design guidelines.

* * * * *